United States Patent [19]
Phillips, Jr.

[11] 3,887,315
[45] June 3, 1975

[54] APPARATUS FOR METERING AND SHAPING MATERIALS

[75] Inventor: Malcolm E. Phillips, Jr., Richmond, Va.

[73] Assignee: AMF Incorporated, White Plains, N.Y.

[22] Filed: Oct. 5, 1973

[21] Appl. No.: 403,870

[52] U.S. Cl. .............................. 425/209; 425/311
[51] Int. Cl. ......................... A01j 17/00; A21c 5/00
[58] Field of Search ............ 425/202, 311, 310, 209

[56] References Cited
UNITED STATES PATENTS

| | | | |
|---|---|---|---|
| 66,277 | 7/1867 | Ames | 425/202 X |
| 3,332,369 | 7/1967 | Freed | 425/311 X |
| 3,459,141 | 8/1969 | Keil | 425/311 X |

Primary Examiner—Andrew R. Juhasz
Assistant Examiner—Leon Gilden
Attorney, Agent, or Firm—George W. Price; Martin Smolowitz

[57] ABSTRACT

An apparatus for receiving and metering discrete amounts of materials from a source of supply by which a stream of material is urged to pass through a nip formed by a pair of rotating rollers. The material, in turn, is directed through passageways into a manifold assembly from whence it is divided for passage through fixed orifices. Associated with such fixed orifices are corresponding movable orifices which are programmed to cooperatively and simultaneously shape and cut the existing material into select portions.

6 Claims, 3 Drawing Figures

APPARATUS FOR METERING AND SHAPING MATERIALS

The present invention is directed to a method and apparatus for the manufacture of discrete or metered amounts of a shaped constituent. More particularly, the invention is directed to an arrangement where for an example, bulk amounts of dough suitable for the manufacture of buns, rolls and the like, is fed into a hopper from a suitable source of supply and by means of metering and shaping such dough, it is possible to automatically introduce such constituent into continually moving pans for further processing in the manufacturing operation.

It is well known, that the prior art operations for the manufacture of high volume dough pieces necessitates a series of steps such as the following: the weighing or scaling off of the dough piece, rounding or intermediary shaping of such piece, flour dusting, intermediate proofing and final shaping of the dough or flattening before deposition into a baking pan. It is quite obvious, that any reduction in the number of steps as described above, would tend to increase the volume production per interval of time as well as, produce an overall cost savings associated with the elimination of certain labor and materials.

In studying these steps in more detail and particularly, the number of steps required to produce a finished product, it has always been necessary to take the dough piece from the dough supply being worked upon and in turn scale same for subsequent conveyance by a suitable conveyor for rounding by a rounding apparatus. Inherent to this operation, is the inability to fully control the relative position of the dough pieces at any given time so as to assure correct deposition of the dough into trays or cups for intermediate proofing. Once intermediary proofing took place, the possibility for doubling up of more than one piece into a single tray space was always there or on the other extreme, empty spaces in certain cups could occur. Here too, the inability to fully control the dough piece represents an important factor motivating those skilled in the art to find means and ways for overcoming such disadvantages.

To those skilled in the art, it is quite apparant that in order to properly shape and mold a piece of dough as it is being worked upon, it is necessary to dust such dough so that it will not adhere to the pans or any of the equipment working upon such dough. Such dusting obviously requires a separate step, as well as, an additional cost in the overall product operation. Obviously, any means for elimination of this step would contribute to a lower cost per unit product.

Additionally, in conventional dough working operations such as hereinbefore described, the mass of dough being worked upon must be recaptured or additionally controlled for final deposition into a pan. Control over the dough movement to assure pan registration and ultimate product quality (minimizing panning errors and misdirection of dough pieces) has contributed to the development of the present invention.

Those skilled in the art have always endeavored to find a labor saving and economically versatile apparatus which could improve upon the required number of operations and yet produce a high quality product. While prior art assemblies have achieved some measure of success in connection with product quality and volume produced, the amount of floor space and overall working area required by such existing assembly lines has necessitated substantial production areas. Furthermore, individual sub-assemblies requiring a multiplicity of machine operations to work upon the dough piece, has resulted in complex equipment which at times has proven difficult to clean and maintain.

Since it is also desirable that the class of goods to be manufactured on such an apparatus should be of sufficient scope to allow for different types and sizes to be manufactured; for an example, such machine should include the facility to produce popular sizes of hamburger and hot dog buns, both individual and in clusters; it follows that by modular construction, the capability and flexibility to allow for aforementioned variations exits. In this connection, interchangeability of parts depending upon the particular product to be produced and throughput rate desired is most advantageous.

In conclusion, it is clear that with rising costs of production, those skilled in the art have long sought different means and ways for reducing the labor cost factor associated with the manufacture of baked goods. Obviously, an apparatus able to efficiently operate at very high speeds with associated high throughput would serve as a basis for overcoming such factors. In addition, the elimination of certain steps in the manufacturing operation and having an automatic apparatus capable of accepting continuous mix or conventional mix doughs, while at the same time, by means of associated features to be defined in more detail hereinafter for completing the dough development, scaling and shaping such dough precisely for the type of product being manufactured and accurately registering such pieces with continually moving series of pans, represents a significent advance in the art.

The principal features of the present invention are directed to an apparatus for the production of discrete portions of material from a source of supply including: a first chamber provided with means for introducing a stream of material to be divided; means for receiving such material and urging the forward movement of the material through a predefined area further downstream; a second chamber juxtapositioned with respect to said first chamber provided with manifolding means for further distributing said material in its further travel; orifice means disposed at a point proximate the exit of said second chamber enabling the egress of said material and means cooperatively associated with said orifice means for defining said discrete portions of material exiting from said orifice means.

Also within the scope of the present invention is a method of manufacturing individual dough pieces for deposition into a continuously moving recepticle means including the steps of: feeding a source of supply of dough material into a metering chamber; partially developing such dough at the nip portion defined by a pair of spaced counter-rotating rollers; drawing said dough through said rollers into a manifolding chamber; dividing said dough stream into several streams in accordance with the adjustment of a baffle means disposed in the path of said dough stream; advancing said dough stream through a fixed orifice means; moving a contoured movable orifice a pre-determined distance to cause registration with said fixed orifice means and severing a discrete portion of dough exiting from said fixed orifice means as it enters into said movable orifice means.

Accordingly, it is the main object of the present invention to provide an apparatus free from the defects of the prior art.

It is still a further object of the present invention to provide an apparatus for automatic manufacture of pre-mixed partially developed dough into suitably developed, scaled and shaped products such as buns.

Still a further object of the present invention is to provide a new and novel apparatus capable of manufacturing a plurality of developed, scaled and suitably shaped dough pieces from a source of supply.

Accordingly, it is still a further object of the present invention to provide an apparatus enabling positive control over the dough stream and individual sections of dough as it travels in the manufacturing operation.

It is still an additional object of the present invention to provide a method for the metering and shaping material under conditions of positive material control during the movement and deposition of discrete amounts of dough material.

Still a further object of the present invention is to provide an apparatus which is more efficient and enables a higher volume of throughput per unit of time as compared to the prior art.

Still another object of the present invention is to provide for a compact, efficient, and modular construction type of apparatus enabling interchangeability and compatibility with other sub-assemblies for the automatic production of select amounts of material and deposition along a continuously moving conveyor belt or deposition into molds of baking pans passing beneath the deposition point.

Still another object of the present invention is to provide for a metering means enabling accurate adjustment for controlling the amount and type of dough being advanced through the machine.

These and other objects of many of the attendant advantages of this invention will be readily appreciated as the same becomes better understood by reference to the following detailed description when considered in connection with the accurate drawings in which:

FIG. 2b is a sectional view taken along line 2b—2b of FIG. 2a.

The basic apparatus of the present invention consists of two essential modules or elements which when combined provide a structural configuration capable of achieving new and novel results.

Figure 1:
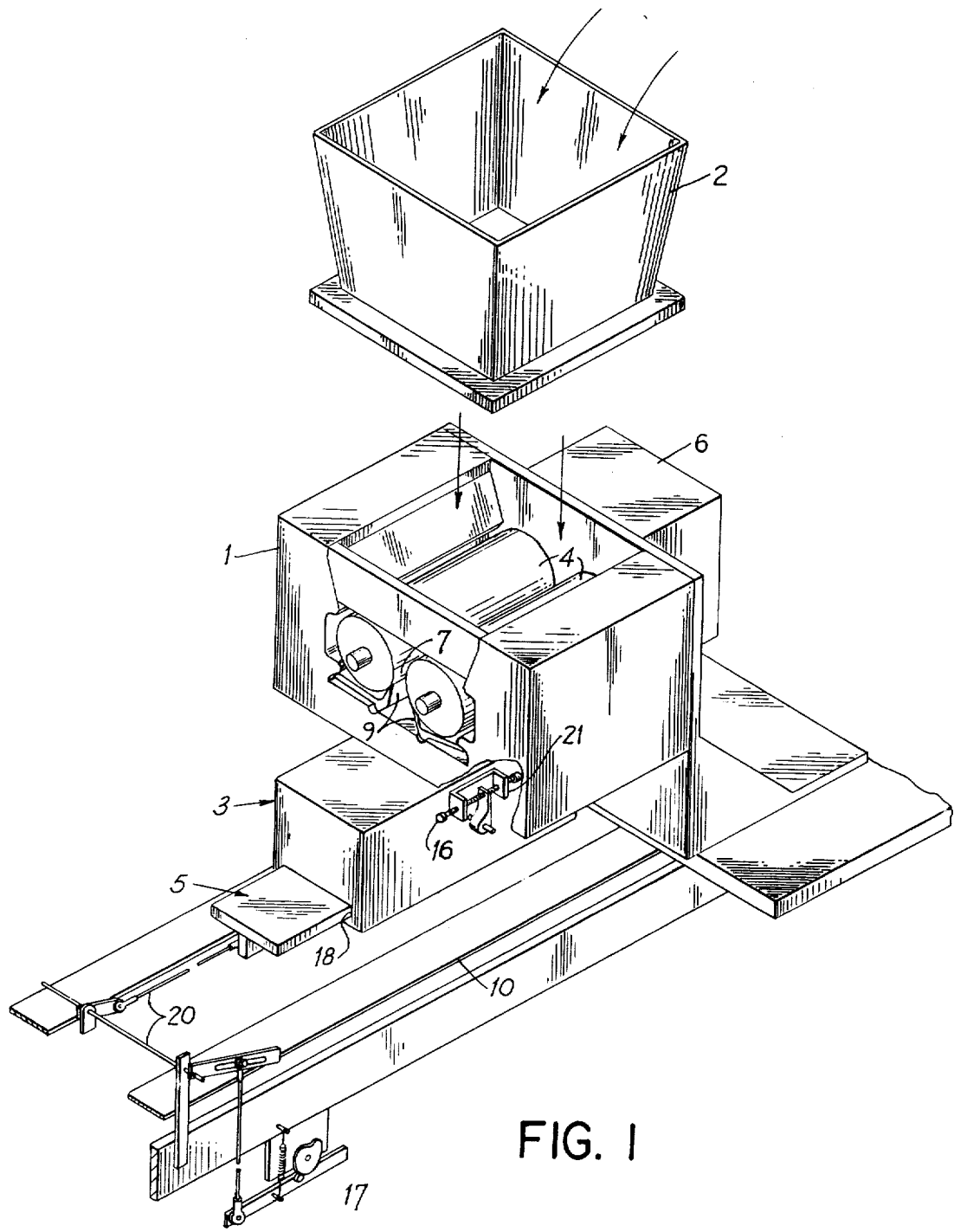
FIG. 1 is a prospective view of the invention partially exploded.

In accordance with FIG. 1, the first component includes a dough conditioning section 1 having a hopper 2 mounted thereon for receiving either continuous mix or conventional mix doughs. This section in turn has associated therewith a second module, namely a shaping and cutting section 3. The second module 3 can be described as the divider shaper section so designed to enable accurate shaping and dividing of the developed dough into suitable shaped individual pieces for subsequent deposition upon and into separate baking pans (or onto a continuously moving band conveyor). Another module (not forming part of this invention) is a pan conveying section 10 which provides for correct control and registration of the pans as they randomly arrive and continually move in a pre-designed path in relation to the dough depositing section. For purposes of explanation, it is assumed that the pans are available in an unlimited supply, and that there is at all times (when the machine is operable) an adequate supply of pans for receiving the continuous pre-shaped and pre-selected amount of dough, as such dough is deposited onto such pans for final proofing and conveyance into the oven for baking.

The dough hopper 2 and metering section 3 perform an essentially mechanical function in taking the pre-mixed raw constituents and working upon them in a manner to enable a dough piece of pre-defined characteristics to ultimately be placed into a pan or a series of pans. The characteristics of this module as will hereinafter be described, covers a structure having sufficient tolerance enabling a wide variety of dough types to be produced.

Figure 2A:
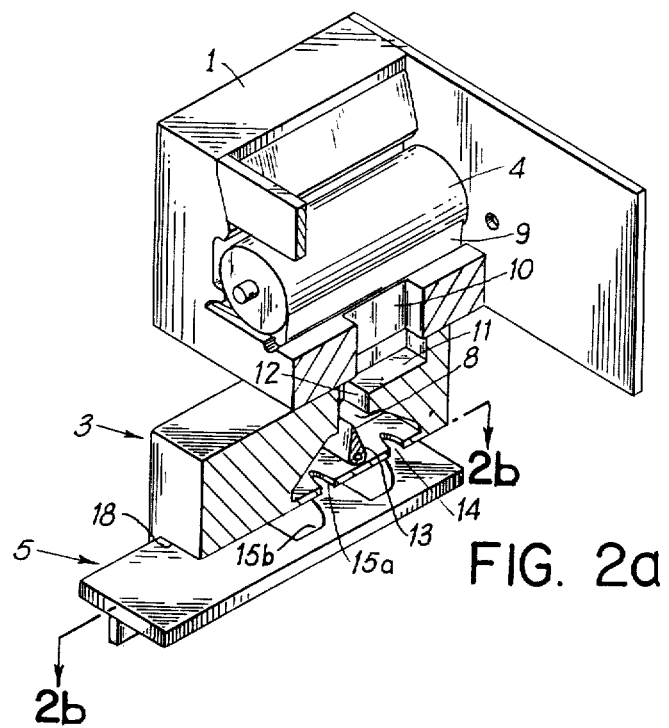
FIG. 2a is a partial sectional view of FIG. 1 taken along the longitudinal center line of FIG. 1.
Figure 2B:
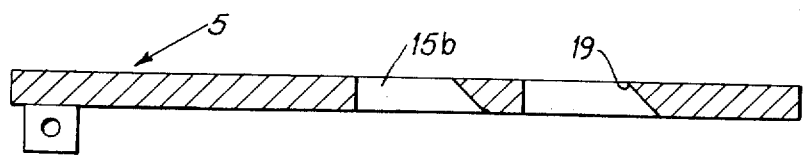

As can be seen from FIG. 1, the dough is introduced into a hopper 2 from a suitable source of supply and in turn is drawn through a pair of smooth contra-rotating rollers 4 immediately below the hopper 2 from whence such dough is ultimately urged to pass through a series of channels (See FIG. 2) and ultimately exit in a ribbon form, to thereafter be shaped and cut by a reciprocating dough shaping and dividing mechanism 5. More specifically, the rollers 4 are driven by an adjustable speed drive 6 in a contra-rotating direction enabling the dough to be drawn from the hopper 2, taken through a nip 7 formed between the rollers and into a manifold chamber 8, disposed below the rollers 4. A roller gap range of about from one-eighth to one-fourth of an inch has been found satisfactory. This setting will obviously be varied for different operating parameters. The rollers 4 each have associated therewith doctor blades 9 to guide the travel of the dough whereby such dough is extruded through the rollers 4 to eventually form a uniform and distinct dough piece of a desired density. It is desirable to have the rollers 4 rotating at a sufficient speed to allow the amount of the throughput to be varied depending upon the type of dough being worked upon. For an example, dough temperature, dough constituency, etc. have a bearing on what roller nip 7 and roller speeds are to be employed. In turn, the development of the dough at the rollers is affected by roller speed.

As the dough passes from the nip 7 of the rollers 4, it proceeds into a channel 10 having a rectangular passageway and then into the second module 3. In turn, the dough is caused to travel into an inlet pocket 11 and is urged into a confined area 12 whereupon such dough is acted upon by one or more baffles 13. This series of passages causes the material to be uniformly distributed under pressure. The number of baffles 13 can be varied in accordance with the number of pieces being manufactured at any given time, such baffles serving to equalize the dough flow through. Generally, there is one less baffle for a given number of orifice openings 14. The action of drawing the dough from the hopper 2 through the nips 7 serves to knead and assist in the completion of dough development as it is delivered to a manifold chamber 8 disposed below such rollers 4. The manifolding in turn allows for uniform velocity profile across orifice openings 14. The above-mentioned baffles 13 and their disposition internal of the passages is controlled by suitable adjusting means 21 by adjusting the screws 16 located outside of the manifold chamber 8. By adjusting such baffles 13, the rate of flow in each stream of material is equally distributed. As the dough material flow continues, such streams or ribbons are delivered to the point of exit reaching an orifice opening 14. The orifice structure (only one will be described, however, it should be understood that the same operation applies to all) will be described in more detail, and consists of a combination of a fixed or stationary 15a orifice and a movable orifice 15b, each of which can be made in any desired geometric configuration.

The fixed orifice 15a is contoured in the metering namely, 3 and is disposed in the lower most portion thereof. Such orifices 15a are in spaced relation with respect to one another to cooperate with the movable orifice 15b. Such movable orifice is connected through a suitable linkage arrangement 20 and is programmed by conventional means such as a cam driven assembly 17 to traverse along a channel 18 formed as part of the metering section 3. By appropriately timing the length of stroke and dwell it is possible to thereby control the movable orifice 15b in a manner to allow for the production of any infinite number of finished product shapes and sized by a suitable choice of three parameters, namely (1) geometric shape of fixed orifice 15a, (2) geometric shape of the movable orifice 15b, and (3) the programmed movement of the movable orifice 15b with respect to the fixed orifice 15a. In turn, the exiting dough after shaping is pinched or severed into a select and discrete portion by action of the movable orifice portion 15b momentarily completely closing off the fixed orifice 15a. In effect, this programmed action of orifice 15b served a dual purpose, namely, to shape and cut off the dough piece.

In accordance with production requirements of the machine to be manufactured, the number of modules 1 and 3 of the type herein described above, together with corresponding control and conveyor systems, can be selected in a quantity consistent with throughput required. Likewise the number of baffles 13 and disposition of same employed in the manifolding chamber 8 can be selected such that the dough stream exiting from the rollers 4 below the hopper 2 can be equally divided into the required number of streams. Generally speaking, there is a correlation of the dough throughput, roller speed, and knife velocity which in turn, governs the amount or quantity produced per machine. The drive for the rollers 4 and movable orifice 15b are conventional types of variable speed drive motors 6.

An alternate embodiment of the present invention can employ a positive displacement pump instead of rotatable rollers, as the means for urging dough from the hopper into a development chamber where a pair of small contra-rotating developer paddles complete the dough development and deliver the dough into the manifold chamber as previously described. In accordance with this arrangement, the positive displacement pumps and developer paddles are independently powered by variable speed drives which provide sufficient control over the metering and development of such dough. The remainder of the apparatus as discussed in the preferred embodiment is of a similar type as described above. In connection with the use of paddles, it has been found that any number of pairs of metering pumps and development paddles can be ganged together in spaced relationship with respect to the hopper, so as to produce a desired number of dough streams and, in turn, obtain the desired throughput range for the given machine requirements.

By controlling the shape of the orifice opening as defined by 15a and 15b (via geometric shapes of orifice openings 15a and 15b and programming of the transverse movement of 15b) it is possible to produce a variety of different shapes of dough product, for an example, hamburger or generally circular buns, as well as frankfurter rolls or generally elongated products. Such a variety is readily attainable by simple adjustment on the same apparatus. The elongated type of product is produced by maintaining the orifice opening at maximum. In turn, by appropriate programming, the length of a given product is determined by the interval of time in which the moving orifice 15b remains in the open position. On the other hand, in the formation of a hamburger roll, as the dough reaches the point of exit of the fixed orifice at 14 the movable orifice 15b starts to gradually expose an opening as defined by the exposed portion of fixed orifice 15a and the edge of moveable orifice 15b dough extrudes through the progressively enlarged opening at 15a; this opening is continuously being formed as a result of the movement of movable orifice 15b, up until the first half of the desired circular hamburger roll shape is attained. Once this occurs, the movable orifice 15b will next travel in a reverse direction so as to gradually decrease the opening and hence the amount of material exiting from the fixed orifices 15a. This continues up until a point of completed closure of such fixed orifice 15a. Simultaneously therewith (complete closure of fixed orifice 15a) the dough piece is severed or pinched by the cutting out of the knife edge 19 of movable orifice 15b.

Extensive testing has demonstrated the reliability and the repeatability of the invention for properly shaping and accurately dividing individual dough pieces to form uniformly shaped rolls of various types such as hamburgers and hot dog buns, when the supply hopper is continually supplied with typical bun doughs which can be produced either by conventional batch mixing or by continuous mix equipment.

While the above described method in apparatus of the present invention has been presented primarily with respect to its application for the manufacture of dough pieces, it is of course obvious that such method of apparatus disclosed and illustrated above, can be employed to provide metered and shaped amounts of any and all types of moldable material. Accordingly, it should be understood that the foregoing relates to only a preferred embodiment of the invention and that it is intended to cover all changes and modifications of the invention herein disclosed for the portion of the disclosure, which do not constitute departure from the spirit and scope of the invention.

What I claim is:

1. An apparatus for the production of discrete portions of material from a source of supply including: a first chamber provided with contra rotating roller means for introducing a stream of material to be divided; means for receiving such material and urging the forward movement of the material through a predefined area further downstream; a second chamber provided with a plurality of predefined channels for receiving material from the point of exit of said first chamber to enable further distribution of said material; said second chamber being juxtapositioned with respect to said first chamber, being provided with manifolding means having adjustable baffle means disposed therein for controllably distributing said stream of material in its course of travel; orifice means disposed at a point proximate the exit of said second chamber enabling the egress of said material and means cooperatively associated with said orifice means being defined by movable orifices conforming in cross-section substantially to that of said fixed orifices including contoured knife portions adapted to co-act with the contour of said fixed orifices for forming said discrete portions of material exiting from said orifice means.

2. An apparatus as claimed in claim 1 wherein: said rotatable rollers are urged to rotate in counter rotating relationship with respect to one another as said material is being fed through said nip downwardly and thence through an exit in said first chamber.

3. An apparatus as claimed in claim 1 wherein: said baffle means being controllable by adjusting means disposed external of said chamber.

4. An apparatus as claimed in claim 1 wherein: said movable orifices being provided with means adapted to traverse said movable orifice in a prescribed manner enabling said material to be shaped and discretely cut within a given interval of time.

5. An apparatus as claimed in claim 4 wherein: programmed movement of said movable orifices with respect to said fixed orifices is adapted to form respective predefined exit cross-sections for shaping said material passing therethrough.

6. An apparatus as claimed in claim 1 wherein: the number of baffles disposed within said manifolding means are of a number one less than the number of fixed orifices.

* * * * *